United States Patent
Kihara

(10) Patent No.: US 9,115,988 B2
(45) Date of Patent: Aug. 25, 2015

(54) IMAGE PROJECTING APPARATUS, IMAGE PROJECTING METHOD, AND MEDIUM

(71) Applicant: Yuka Kihara, Kanagawa (JP)

(72) Inventor: Yuka Kihara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 142 days.

(21) Appl. No.: 13/915,752

(22) Filed: Jun. 12, 2013

(65) Prior Publication Data

US 2014/0016105 A1    Jan. 16, 2014

(30) Foreign Application Priority Data

Jul. 12, 2012 (JP) ................................. 2012-156882

(51) Int. Cl.
*G03B 21/20* (2006.01)
*G01C 3/10* (2006.01)
*G03B 21/14* (2006.01)

(52) U.S. Cl.
CPC ........ *G01C 3/10* (2013.01); *G03B 21/14* (2013.01); *G03B 21/2053* (2013.01)

(58) Field of Classification Search
CPC ........... G01C 3/10; G01C 3/085; G03B 21/14
USPC .......... 353/30, 31, 69–70, 85, 94; 349/5, 7–9; 348/743–747
See application file for complete search history.

(56) References Cited

U.S. PATENT DOCUMENTS

| 6,769,774 B2 * | 8/2004 | McDowell ...................... 353/84 |
| 7,699,476 B2 * | 4/2010 | Denoue et al. ................. 353/122 |
| 8,382,287 B2 * | 2/2013 | Keh ................................. 353/31 |
| 8,434,873 B2 * | 5/2013 | Feng et al. ....................... 353/20 |
| 2007/0071430 A1 * | 3/2007 | Iwanaga ......................... 396/114 |
| 2007/0115440 A1 * | 5/2007 | Wiklof .............................. 353/69 |
| 2011/0199588 A1 * | 8/2011 | Kato ................................ 353/85 |
| 2011/0316896 A1 * | 12/2011 | Okamoto et al. ............. 345/690 |

FOREIGN PATENT DOCUMENTS

| JP | 2006-267144 | 10/2006 |
| JP | 2009-265296 | 11/2009 |
| JP | 2011-112862 | 6/2011 |

* cited by examiner

*Primary Examiner* — Sultan Chowdhury
(74) *Attorney, Agent, or Firm* — Oblon, McClelland, Maier & Neustadt, L.L.P.

(57) ABSTRACT

An image projecting apparatus that includes an illumination measuring unit that measures illumination of light illuminated on a side of the image projecting apparatus opposite a supported surface of the image projecting, an illumination calculator that calculates illumination at the projection surface based on the measured illumination, and a projection light intensity determining unit that determines luminous intensity of projection light from an image projecting unit that projects an image on the projection surface. The illumination calculator calculates illumination at the projection surface based on optical reflecting characteristics of the installation environment of the image projecting apparatus.

10 Claims, 10 Drawing Sheets

FIG. 8

| OUTPUT LEVEL | ENVIRONMENT ILLUMINATION (lx) | ELECTRIC POWER VALUE (W) |
|---|---|---|
| 1 | 625– | 260 |
| 2 | 400–624 | 230 |
| 3 | 250–399 | 200 |
| 4 | 150–249 | 170 |
| 5 | 0–150 | 140 |

FIG. 9

| OUTPUT LEVEL | LOWER LIMIT VALUE (lx) | UPPER LIMIT VALUE (lx) | DARK THRESHOLD VALUE (lx) | BRIGHT THRESHOLD VALUE (lx) | ELECTRIC POWER VALUE (W) |
|---|---|---|---|---|---|
| 1 | 625 | * | 562.5 | | 260 |
| 2 | 400 | 624 | 360.0 | 686.4 | 230 |
| 3 | 250 | 399 | 225.0 | 438.9 | 200 |
| 4 | 150 | 249 | 135.0 | 273.9 | 170 |
| 5 | 0 | 150 | | 165.0 | 140 |

* UPPER MEASURING LIMIT FOR ILLUMINATION SENSOR

FIG. 11

| ENVIRONMENT NAME | STANDARD ILLUMINATION (lx) |
|---|---|
| CONFERENCE ROOM | 700 |
| RECEPTION ROOM | 200 |
| DRAFTING ROOM | 750 |
| ASSEMBLY ROOM | 500 |
| RECEPTION ROOM | 300 |
| EXECUTIVE ROOM | 750 |
| ASSEMBLY HALL | 200 |
| GYMNASIUM | 200 |
| CLASSROOM | 300 |
| LABORATORY | 500 |
| ⋮ | ⋮ |

FIG. 12

| COLOR | REFLECTANCE (%) |
|---|---|
| WHITE | 70 |
| BEIGE | 45 |
| BROWN | 25 |
| YELLOW | 50 |
| RED | 20 |
| GREEN | 30 |
| BLUE | 20 |
| GRAY | 35 |
| BLACK | 4 |
| ⋮ | ⋮ |

FIG. 13

| MATERIAL | REFLECTANCE (%) |
|---|---|
| FLOORING | 85 |
| TILE | 75 |
| CARPET | 20 |
| CONCRETE | 25 |
| TATAMI | 35 |
| STONE | 40 |
| TRANSMISSION GLASS | 10 |
| SHADING GLASS | 70 |
| METAL | 85 |
| BRICK | 40 |
| ⋮ | ⋮ |

IMAGE PROJECTING APPARATUS, IMAGE PROJECTING METHOD, AND MEDIUM

CROSS-REFERENCE TO RELATED APPLICATION

This patent application is based on and claims priority pursuant to 35 U.S.C. §119 to Japanese Patent Application No. 2012-156882, filed on Jul. 12, 2012 in the Japan Patent Office, the entire disclosure of which is hereby incorporated by reference herein.

BACKGROUND

1. Technical Field

The present invention relates to an image projecting apparatus, image projecting method, and medium.

2. Background Art

Conventionally, an image projecting apparatus such as a projector is widely used for projecting images and moving images that include necessary information (hereinafter referred to as "video") on a projection surface such as a wall or a screen to present information to attendees at meetings, lectures, and presentations. The image projecting apparatus displays video by projecting it as light on the projection surface, and a presenter and audience (hereinafter referred to as "users") see the video by recognizing light that the projection surface reflects visually. The image projecting apparatus is not only mounted on a floor or a desktop (hereinafter referred to as "floor-mounted") but can also be suspended a ceiling (hereinafter referred to as "ceiling-mounted"). It should be noted that, in case of being ceiling-mounted, the image projecting apparatus is installed so that the bottom surface (the supported surface in case of being floor-mounted) of the image projecting apparatus faces the ceiling.

In using the image projecting apparatus, it is necessary to project the video while adjusting the amount of projection light and the brightness and intensity of the video signal appropriately. However, the use environment since environment where the image projecting apparatus is not always constant, and the illumination and intensity vary with the use environment. For example, in a use environment where illumination is high, the contrast of the projected video deteriorates, thereby reducing visibility for users. Also, in a use environment where high wavelength range light is stronger than other wavelength range light, high wavelength range reflected light of projected video decays whereas light of other wavelength ranges appears enhanced, thereby reduced visibility for users.

Thus, on the opposite surface of the supported surface of the image projecting apparatus, an illumination sensor that measures illumination of light illuminated on the opposite surface of the supported surface is usually provided. In addition, the image projecting apparatus is equipped with a function that automatically adjusts the amount of projection light and the brightness and intensity of the video signal based on the illumination measured by the illumination sensor. Consequently, brightness and color of video projected on the screen can be adjusted appropriately, thereby improving visibility for users.

In case the image projecting apparatus is mounted on the floor or the desktop (floor-mounted), the illumination sensor mainly measures illumination by light from lighting in the use environment and window (hereinafter referred to as "environment light") illuminated on the illumination sensor directly. Meanwhile, in case the image projecting apparatus is suspended from the ceiling (ceiling-mounted), the illumination sensor mainly measures illumination by light that the floor and the desktop (hereinafter referred to as "reflecting surface") reflect the environment light.

Consequently, in case reflectance of the reflecting surface is less than 1, illumination measured by the illumination sensor in case of being floor-mounted is different from illumination measured by the illumination sensor in case of being ceiling-mounted even in the same use environment. Thus, visibility for users differs due to the difference in installation of the image projecting apparatus even in the same use environment.

To cope with this issue, in order to convert brightness and color components of the video signal input from an external device such as a personal computer (PC), an image projecting apparatus that divides illumination range by predefined width for each case of being floor-mounted and being ceiling-mounted, sets modes corresponding to each range, and converts the brightness and color components in accordance with mode that corresponds to the measured illumination has been proposed (e.g., JP-2006-267144-A.)

In the technology described in JP-2006-267144-A, since different modes are set for case of floor-mounted and ceiling-mounted, brightness and color components are converted in accordance with different mounting statuses, thereby improving visibility for users.

As described above, in case of being ceiling-mounted, since the illumination sensor measures illumination by light that reflecting surfaces such as the floor reflects the environment light, the illumination varies depending on reflecting characteristics due to material and color of the reflecting surface. For example, reflectance of carpet is lower than flooring as for material, and reflectance of darker color is lower than whiter color. Therefore, it is difficult to measure or estimate illumination precisely and to improve visibility for users instead of considering reflecting characteristics due to material and color of the reflecting surface.

However, in the technology described in JP-2006-267144-A, standardized distinction that illumination measured in case of being ceiling-mounted approximately becomes a tenth of illumination measured in case of being floor-mounted, and reflecting characteristic of reflecting surface is not considered. Therefore, in the technology described in JP-2006-267144-A, mode can be determined by illumination widely different from actual illumination depending on reflecting characteristics of reflecting surfaces, thereby reduced visibility for users.

SUMMARY

The present invention provides a novel image projecting apparatus and image projecting method that improves visibility of projected video for users in case of both being floor-mounted and being ceiling-mounted.

More specifically, the present invention provides an image projecting apparatus that includes an illumination measuring unit that measures illumination of light illuminated on the opposite side of the supported surface of the image projecting apparatus, an illumination calculator that calculates illumination at the projection surface based on the measured illumination, and a projection light intensity determining unit that determines luminous intensity of projection light from an image projecting unit that projects an image on the projection surface, and the illumination calculator calculates illumination at the projection surface based on optical reflecting characteristic of the opposite side of the ceiling in case of being ceiling-mounted.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 8 is a diagram illustrating an electric power determining table as an embodiment of the present invention.

FIG. 9 is a diagram illustrating another electric power value determining table as an embodiment of the present invention.

FIG. 11 is a diagram illustrating a table of standardized illumination predefined for each environment as an embodiment of the present invention.

FIG. 12 is a diagram illustrating a table of reflectance predefined for each color of floor as an embodiment of the present invention.

FIG. 13 is a diagram illustrating a table of reflectance predefined for each material of floor as an embodiment of the present invention.

DETAILED DESCRIPTION

Figure 1:
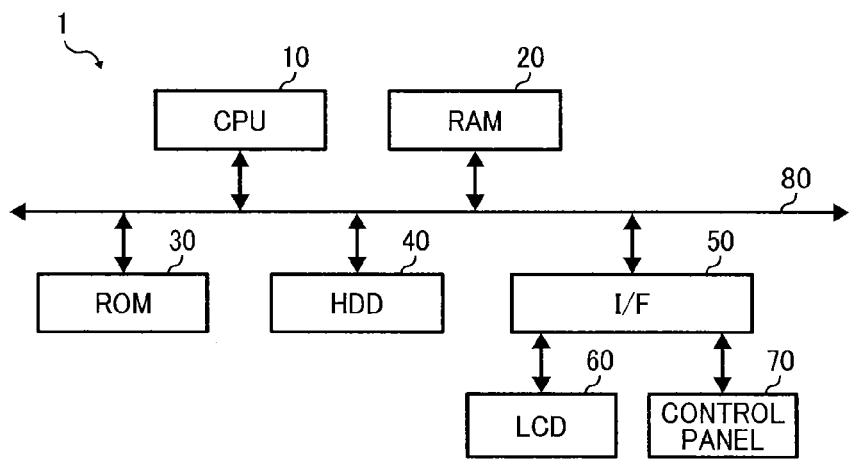
FIG. 1 is a block diagram illustrating a hardware configuration of an image projecting apparatus as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In this embodiment, an image projecting apparatus that forms an optical image by modulating a beam of light projected from a light source in accordance with a video signal input from an external device such as a PC and projects the formed optical image on a projection surface such as a screen will be described in detail below. Also, the image projecting apparatus in this embodiment can be both mounted on a floor or a desktop (floor-mounted) or suspended from a ceiling (ceiling-mounted). It should be noted that, in this embodiment, a supported surface of the image projecting apparatus in case of being floor-mounted faces the ceiling in case of being ceiling-mounted.

Also, the image projecting apparatus in this embodiment is equipped with an illumination sensor on the opposite surface of the supported surface, measures illumination illuminated on the opposite surface of the supported surface, and adjusts the amount of projection light and the brightness and intensity of the video signal automatically based on the illumination measured by the illumination sensor.

The image projecting apparatus in this embodiment can measure illumination considering optical reflecting characteristic of the floor in case of being ceiling-mounted, thereby acquiring almost same illumination measured in case of being floor-mounted in the same use environment. Also, the image projecting apparatus in this embodiment can presume illumination at the projection surface based on the measured illumination described above and adjust amount of projection light and convert brightness and intensity of the input video signal based on the presumed illumination.

Consequently, since the image projecting apparatus in this embodiment can acquire precise information on environment at the projection surface in case of both being ceiling-mounted and floor-mounted, the image projecting apparatus can project projection light appropriate for brightness and intensity at the projection surface, thereby improving visibility of projected video for users.

FIG. 1 is a block diagram illustrating a hardware configuration of an image projecting apparatus 1 in this embodiment. It should be noted that the image projecting apparatus 1 includes an optical mechanism to project an image on the screen in addition to the hardware configuration shown in FIG. 1.

As shown in FIG. 1, the image projecting apparatus 1 in this embodiment includes the same configuration as generic servers and PCs. That is, the image projecting apparatus 1 in this embodiment includes a Central Processing Unit (CPU) 10, a Random Access Memory (RAM) 20, a Read Only Memory (ROM) 30, a Hard Disk Drive (HDD) 40, and an I/F 50 which are connected with each other via a bus 80. Also, a Liquid Crystal Display (LCD) 60 and a control panel 70 are connected to the I/F 50.

The CPU 10 is a processing unit and controls whole operation of the image projecting apparatus 1. The RAM 20 is a volatile memory device that information can be written and read at high speed and is used as a working area when the CPU 10 processes information. The ROM 30 is a read-only non-volatile memory device and stores programs such as firmware. The HDD 40 is a nonvolatile memory device that information can be written and read and stores an Operating System (OS), various control programs, and application programs etc.

The I/F 50 connects the bus 80 with various hardware and network, etc., and controls them. The LCD 60 is a visual user interface that a user checks the status of the image projecting apparatus 1. The control panel 70 is a user interface that a user inputs information into the image projecting apparatus 1.

In this hardware configuration, programs stored in the ROM 30, the HDD 40, or a memory device such as an optical disk (not shown) are transferred to the RAM 20, and software control units are configured by the CPU's executing operations in accordance with the programs transferred to the RAM 20. Consequently, functional blocks that implement functions of the image projecting apparatus 1 in this embodiment are configured in combination with the software configuration and the hardware configuration.

Figure 2:
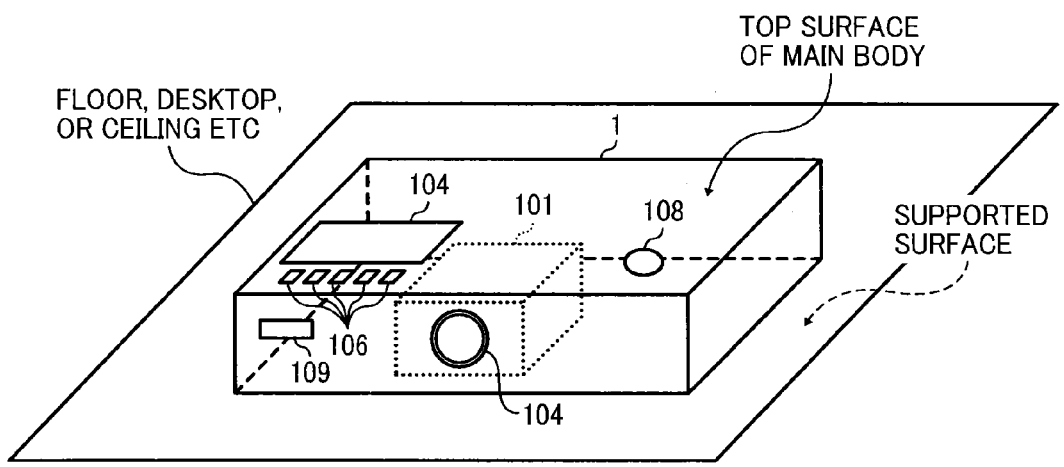
FIG. 2 is a perspective diagram illustrating a simplified outer and inner configuration of the image projecting apparatus as an embodiment of the present invention.
Figure 3:
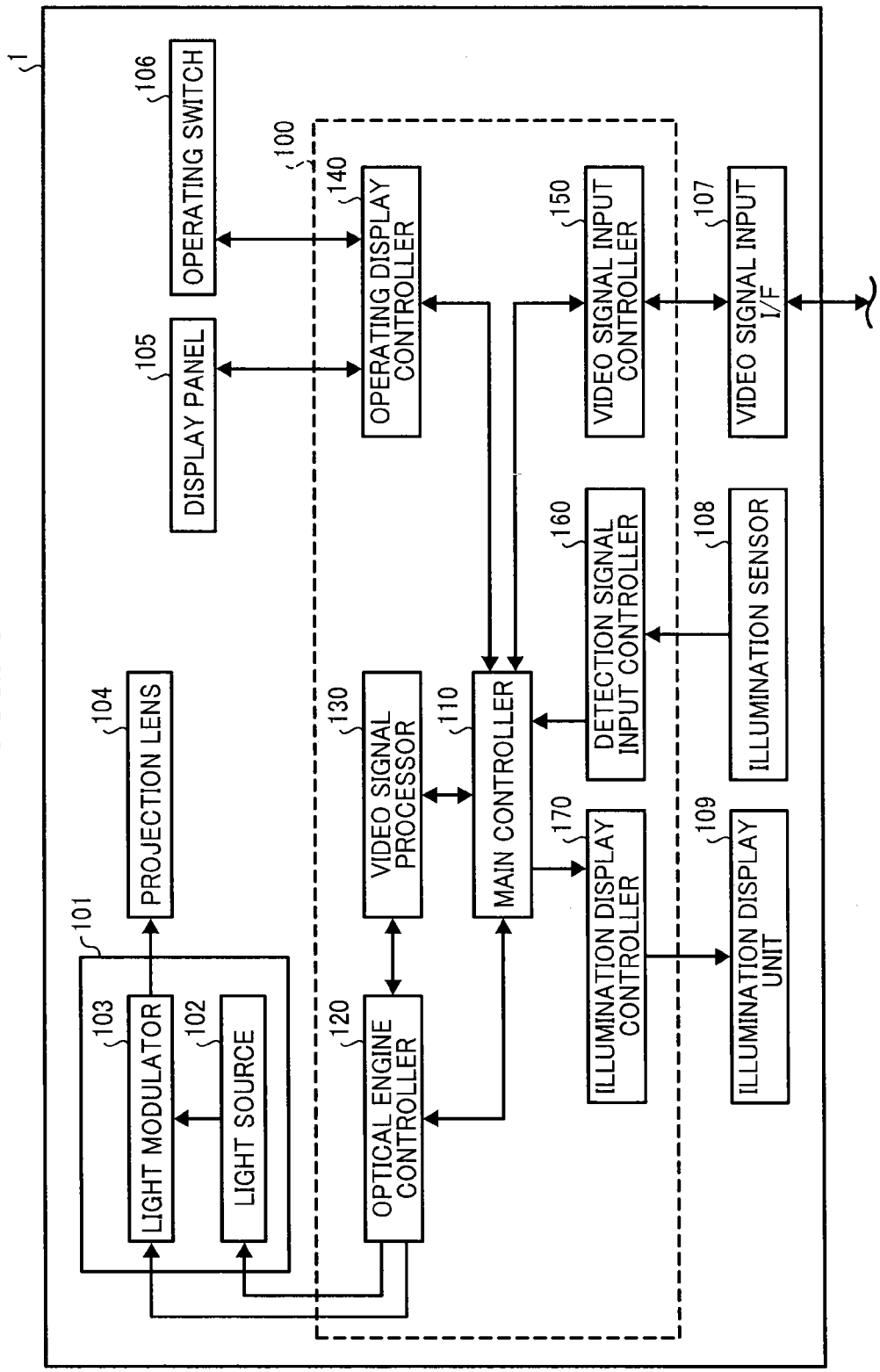
FIG. 3 is a functional block diagram illustrating of the image projecting apparatus as an embodiment of the present invention.

Next, a functional configuration of the image projecting apparatus 1 in this embodiment will be described below with reference to FIG. 2 and FIG. 3. FIG. 2 is a perspective diagram illustrating a simplified outer and inner configuration of the image projecting apparatus 1, and FIG. 3 is a block diagram illustrating a functional configuration of the image projecting apparatus 1. It should be noted that the supported surface of the image projecting apparatus 1 is at right angle with the projection surface 2 in this embodiment. As shown in FIG. 2, the supported surface is a floor surface or a desktop surface in case of being floor-mounted and a ceiling surface in case of being ceiling-mounted.

As shown in FIG. 2, the image projecting apparatus 1 in this embodiment includes a controller 100, an optical engine 101, a projecting lens 104, a display panel 105, an operating switch 106, a video signal input I/F 107, an illumination sensor 108, and an illumination display unit 109.

Also, the controller 100 includes a main controller 110, an optical engine controller 120, a video signal processor 130, an operating display controller 140, a video signal input controller 150, a detection signal input controller 160, and an illumination display controller 170. It should be noted that electrical connections are drawn with solid arrows in FIG. 2.

The optical engine 101 includes a light source unit 102 and a light modulator 103 and projects video on a projection surface such as a screen from a projection lens 104 based on the video signal input from external devices such as PCs and processed by the video signal processor 130 under the control of the optical engine controller 120. The light source unit 102 is implemented by a lamp and projects beam of light on the light modulator 103. The light modulator 103 modulates beam of light projected from the light source unit 102 in accordance with the video signal, and forms an optical image and projects it on the projection lens 104. The projection lens 104 projects the optical image formed by modulating the beam of light projected from the light source 102 at the light modulator 103 on the projection surface such as the screen. It should be noted that the projection lens 104 is a perfect circle in this embodiment. That is, the optical engine 101 functions as an image projector in this embodiment.

The display panel 105 is an output interface to display the status of the image projecting apparatus 1 visually and an input interface that a user operates the image projecting apparatus 1 directly as a touch panel and inputs information into the image projecting apparatus 1. That is, the display panel 105 includes a function that displays an image to accept user operation. The display panel 105 is implemented by the LCD 60 and the control panel 70 shown in FIG. 1. The operating switch 106 is an input interface that a user uses to operate the image projecting apparatus 1 directly and which inputs information into the image projecting apparatus 1, and is a mechanical operating unit such as mechanical switches. The operating switch 106 is implemented by the control panel 70 shown in FIG. 1.

A video signal input I/F 107 is an interface that the image projecting apparatus 1 communicates with client terminals such as PCs and other external devices via a network etc., and interfaces such as Universal Serial Bus (USB), mini D-sub 15 pin, RS-232C, and High Definition Multimedia Interface (HDMI) are used as the video signal input I/F 107. The video signal input I/F 107 is implemented by the I/F 50 shown in FIG. 1.

An illumination sensor 108 is equipped on the opposite surface of the supported surface (hereinafter referred to as "upper surface of main body") of the image projecting apparatus 1 as shown in FIG. 2 and outputs a detection signal to the detection signal input controller 160 after detecting light illuminated on the illumination sensor 108. The detection signal input controller 160 inputs the detection signal output by the illumination sensor 108 into the main controller 110. Subsequently, the main controller 110 calculates illumination of the light detected by the illumination sensor 108 and outputs it. That is, the illumination sensor 108, the main controller 110, and the detection signal input controller 160 functions as an illumination measuring unit in this embodiment. An illumination display unit 109 includes multiple Light Emitting Diodes (LEDs) and presents the illumination measured by the illumination sensor 108 (hereinafter referred to as "measured illumination") to the user visually by controlling the LEDs. An illumination display controller 170 controls the LEDs included in the illumination display unit 109 in accordance with the measured illumination by controlling the illumination display unit 109 in accordance with the illumination output by the main controller 11.

The controller 100 is comprised of combination of software and hardware. More particularly, after transferring programs stored in nonvolatile memory devices such as the ROM 30, the HDD 40, and the optical disks etc. to volatile memory such as the RAM 20 etc., software control units is implemented by the CPU 10's operating in accordance with the programs, and the controller 100 is comprised of the software control units and hardware such as integrated circuits. The controller 100 functions as a controlling unit that controls the overall image projecting apparatus 1.

The main controller 110 controls and commands each unit included in the controller 100. The optical engine controller 120 controls and drives the optical engine 101 in accordance with the video signal input by the video signal processor 130.

The video signal processor 130 executes converting process of brightness and color components etc. on the video signal input from the external devices such as the PC to make the video signal appropriate for projecting the video by the optical engine 101 under the control of the main controller 110 and inputs it into the optical engine controller 120. The operation display controller 140 displays information on the display panel 105 and notifies the main controller 110 of information input via the display panel 105 and the operating switch 106. The video signal input controller 150 inputs information input via the video signal input I/F 107 into the main controller 110.

One of the main points of the image projecting apparatus 1 in this embodiment is to measure illumination considering light reflecting characteristic of the floor in case of being ceiling-mounted. Consequently, the image projecting apparatus 1 in case of being ceiling-mounted can acquire illumination almost the same as in case of being floor-mounted in the same use environment. Therefore, the image projecting apparatus 1 in this embodiment can acquire precise information on use environment even in case of being ceiling-mounted.

Another main feature of the image projecting apparatus 1 in this embodiment is to presume illumination at the projection surface based on the measured illumination as described above, and adjust amount of projection light and convert brightness and intensity of the input video signal based on the presumed illumination. Consequently, since the image projecting apparatus 1 can acquire precise information on environment at the projection surface, the image projecting apparatus 1 can project projection light appropriate for brightness and intensity at the projection surface. Therefore, the image projecting apparatus 1 can improve visibility of the projected video for users.

Figure 4:
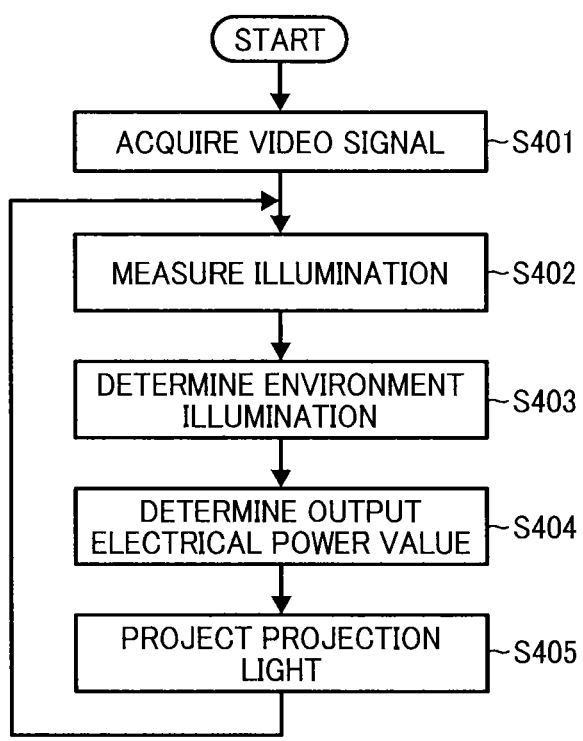
FIG. 4 is a flowchart illustrating a process of projecting video on a projection surface as an embodiment of the present invention.

Next, a process that the image projecting apparatus 1 in this embodiment projects video on the projection surface with reference to FIG. 4. FIG. 4 is a flowchart illustrating a process of projecting video on the projection surface in the image projecting apparatus 1 in this embodiment. As shown in FIG. 4, in projecting video on the projection surface, the image projecting apparatus 1 in this embodiment firstly acquires video signal from the external device such as the PC (S401). Subsequently, the image projecting apparatus 1 measures illumination using the illumination sensor 108 (S402) and determines environment illumination based on the measured illumination (S403). Here, the environment illumination means illumination at the projection surface and will be described in detail later. After determining the environment illumination, the image projecting apparatus 1 determines output electric power value of the light source unit 102 that projects projection light based on the determined environment illumination (S404) and projects the video at the determined output electric power value (S405). That is, the output electric power value in this embodiment corresponds to luminous intensity of projection light. Subsequently, the image projecting apparatus 1 repeats the process from S402 until projection of video ends.

Figure 5:
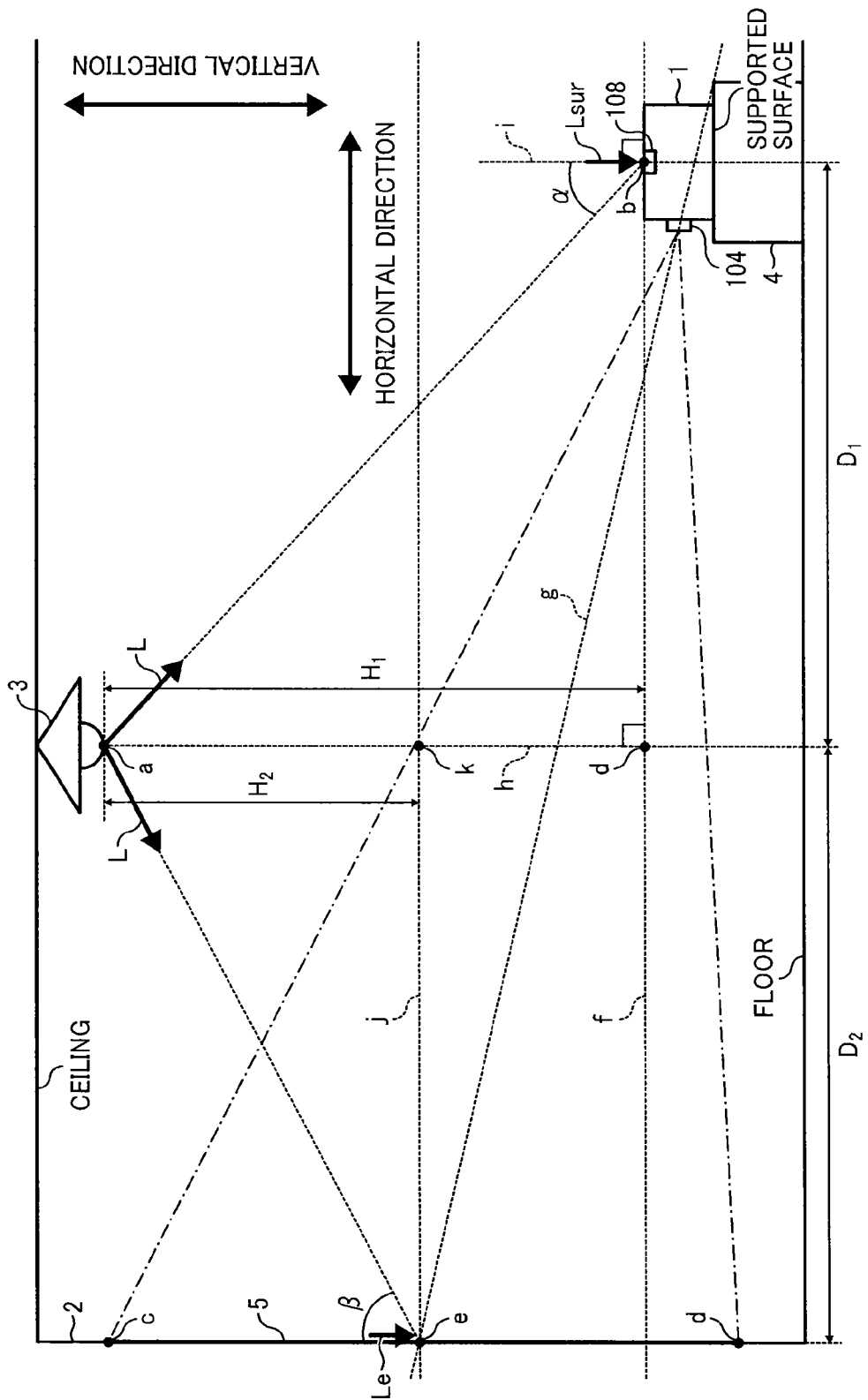
FIG. 5 is a diagram illustrating relative positions of the image projecting apparatus, the projection surface, and a light source in case of being floor-mounted as an embodiment of the present invention.

Next, how the image projecting apparatus 1 in this embodiment determines environment illumination in case of being floor-mounted, that is, the process in S403 in FIG. 4 will be described below with reference to FIG. 5. FIG. 5 is a diagram illustrating relative positions of the image projecting apparatus 1, a projection surface 2, and a light source 3 in case of being floor-mounted in this embodiment. In FIG. 5, the image projecting apparatus 1 is mounted on an installation board 4 such as a desk or a table on the floor. Here, the environment illumination means illumination at the projection surface. It should be noted that FIG. 5 is a cross-sectional diagram illustrating space where the image projecting apparatus 1 is used (hereinafter referred to as "use space") from a viewpoint parallel to both the projection surface 2 and the supported surface.

Here, a lighting apparatus such as a fluorescent lamp or an incandescent lamp installed at the use space such as a conference room or a multipurpose hall is used as the light source 3. It should be noted that distance between the light source 3 and the illumination sensor 108 and distance between the light source 3 and the projection surface 2 are long enough, so the light source 3 will be regarded as point source of light below. Also, direction perpendicular to the supported surface will be regarded as vertical direction, and direction perpendicular to the projection surface 2 will be regarded as horizontal direction below. It should be noted that direction to which the image projecting apparatus 1 projects the projection light (hereinafter referred to as "projection direction") is parallel to the horizontal direction in this embodiment.

In FIG. 5, the light source regarded as the point source of light is located as a point a, the illumination sensor 108 in the image projecting apparatus 1 mounted on the installation board 4 is located at a point b, a top edge of a video 5 projected on the projection surface 2 is located at a point c, a bottom edge of a video 5 projected on the projection surface 2 is located at a point d, center point of a line segment cd that connects the point c with the point d on the projection surface 2 is located at a point e, a line f parallel to the horizontal direction passes through the point b, a line g passes through the center of the projection lens 104 and the point c and is an optical axis that the image projecting apparatus 1 projects the projection light, a line h parallel to the vertical direction passes through the point a, a line i parallel to the vertical direction passes through the point b, a line j parallel to the horizontal direction passes through the point e, and the line h and the line j intersect at a point k. It should be noted that illumination at the point e is approximated to illumination at the projection surface, that is, the environment illumination, and obtaining the environment illumination is one of the main features in this embodiment. Therefore, the projection surface 2 will be located at the point e in description below.

Also, in FIG. 5, $H_1$ is length of a line segment ad, that is, distance between the light source 3 and the illumination sensor 108 in the vertical direction, $H_2$ is length of a line segment ak, that is, distance between the light source 3 and the projection surface 2 in the vertical direction, $D_1$ is length of a line segment bd, that is, distance between the light source 3 and the illumination sensor 108 in the horizontal direction, and $D_2$ is length of a line segment ek, that is, distance between the light source 3 and the projection surface 2 in the horizontal direction. Also, the line segment ab and the line i intersect at an acute angle α, and a line segment ae and a line segment cd intersect at an acute angle β.

Figure 6:
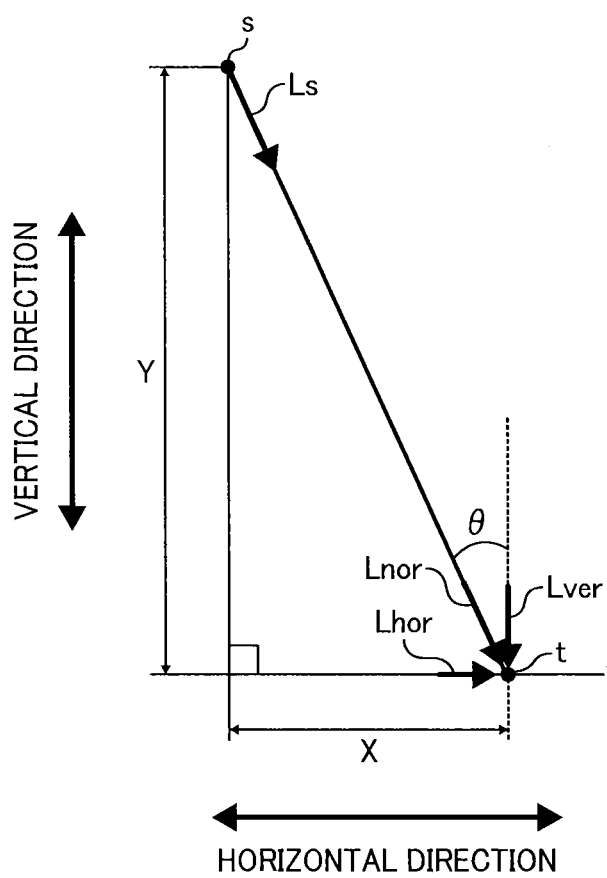
FIG. 6 is a diagram illustrating a point method as an embodiment of the present invention.

In this positional relationship, illumination at the point e, that is, the environment illumination can be estimated by using point method. The point method can calculate illumination at a point t in the positional relationship shown in FIG. 6. In FIG. 6, the point source of light is located at a point s, and the illumination is obtained at the point t. Also, in FIG. 6, distance between the point s and the point t in the horizontal direction is X, distance between the point s and the point t in the vertical direction is Y, and a line segment st and the vertical direction intersect at an acute angle θ.

In applying the point method in this positional relationship shown in FIG. 6, assuming illumination at a point lm away from the point source of light as $L_s$, illumination $L_{nor}$ in a direction along which the light source 3 illuminates toward the point t (hereinafter referred to as "normal direction") can be calculated by using following equation:

[Equation 1]

$$L_{nor} = \frac{L_s}{(X^2 + Y^2)}[lx] \qquad (1)$$

From the Equation 1 above, illumination $L_{ver}$ in the vertical direction and $L_{hor}$ in the horizontal direction at the point t can be calculated by using following equation:

[Equation 2]

$$L_{ver} = \frac{L_s}{(X^2 + Y^2)} \times \cos\theta[lx] \qquad (2)$$

[Equation 3]

$$L_{hor} = \frac{L_s}{(X^2 + Y^2)} \times \sin\theta[lx] \qquad (3)$$

As described above, if illumination at a point lm away from the point source of light and positional relationship with point source of light are given, the illumination at any point can be estimated without measuring actually. In the description below, illuminations are in the vertical direction except the illumination of the light source unless otherwise noted. Consequently, illumination measured by the illumination sensor 108 indicates the illumination of light illuminated in the vertical direction among the light illuminated on the illumination sensor 108.

In applying the point method in this positional relationship shown in FIG. 5, assuming illumination at a point lm away from the light source 3 as L (hereinafter referred to as "illumination of the light source 3"), illumination $L_b$ of the illumination sensor 108 at the point b can be calculated by using following equation:

[Equation 4]

$$L_b = \frac{L}{(H_1^2 + D_1^2)} \times \cos\alpha \, [lx] \quad (4)$$

If the illumination calculated by the Equation 4 is assumed as illumination that the illumination sensor 108 actually measures (hereinafter referred to as "measured illumination"), following equation holds since $L_{sur}$ equals $L_b$ assuming the measured illumination as $L_{sur}$:

[Equation 5]

$$\text{Measured illumination} \quad L_{sur} = \frac{L}{(H_1^2 + D_1^2)} \times \cos\alpha \, [lx] \quad (5)$$

Similarly, illumination at the point e, that is, the environment illumination $L_e$ can be calculated by using following equation:

[Equation 6]

$$\text{Environment illumination} \quad L_e = \frac{L}{(H_2^2 + D_2^2)} \times \cos\beta \, [lx] \quad (6)$$

An equation for calculating L can be obtained by transforming the Equation 5 as follows:

[Equation 7]

$$L = \frac{L_{sur} \times (H_1^2 + D_1^2)}{\cos\alpha} [lx] \quad (7)$$

Consequently, Equation 8 that expresses the environment illumination $L_e$ can be obtained by substituting the illumination of the light source 3 L in the Equation 6 above:

[Equation 8]

$$\text{Environment illumination} \quad L_e = \frac{L_{sur} \times (H_1^2 + D_1^2)}{(H_2^2 + D_2^2)} \times \frac{\cos\beta}{\cos\alpha} [lx] \quad (8)$$

Therefore, the environment illumination $L_e$ can be estimated by substituting concrete values for $L_{sur}$, $H_1$, $D_1$, $H_2$, $D_2$, $\alpha$, and $\beta$ in the Equation 8 above. As described above, the environment illumination $L_e$ can be estimated from the measured illumination $L_{sur}$ by applying the point method in case of being floor-mounted. That is, after obtaining the illumination of the light source 3 L by using the measured illumination $L_{sur}$ and the Equation 7, the environment illumination $L_e$ can be estimated by using the obtained L and the Equation 8 above. As described above, estimating the environment illumination $L_e$ from the measured illumination $L_{sur}$ precisely is one of the main points in this embodiment.

It should be noted that a user needs to measure values in the Equation 8 except $L_{sur}$ in the use space actually. Therefore, if it is difficult to measure those values, the environment illumination $L_e$ can be estimated as the measured illumination $L_{sur}$ measured by the illumination sensor 108.

Next, how the image projecting apparatus 1 in this embodiment determines environment illumination in case of being ceiling-mounted will be described below with reference to FIG. 7.

Figure 7:
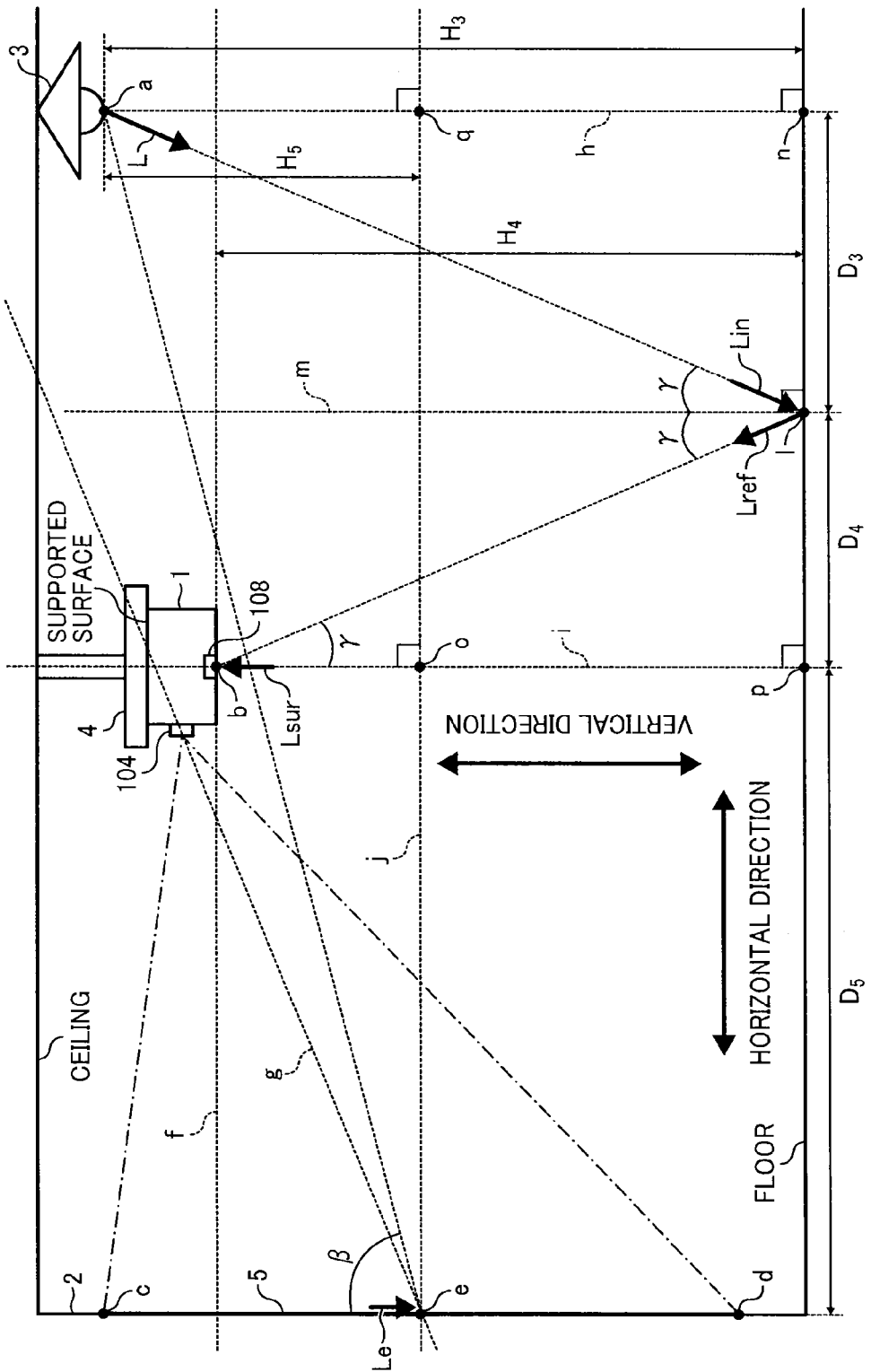
FIG. 7 is a diagram illustrating relative positions of the image projecting apparatus, the projection surface, and a light source in case of being ceiling-mounted as an embodiment of the present invention.

FIG. 7 is a diagram illustrating relative positions of the image projecting apparatus 1, the projection surface 2, and the light source 3 in case of being ceiling-mounted in this embodiment. In FIG. 7, the image projecting apparatus 1 is installed on the installation board 4 such as a suspension board suspended from the ceiling upside down in case of being floor-mounted. It should be noted that FIG. 5 is a cross-sectional diagram illustrating the use space from a viewpoint parallel to both the projection surface 2 and the supported surface. Also, in FIG. 7, the same symbols are used to indicate the same points, lines, line segments, angles, and distances as in FIG. 5.

In FIG. 7, light illuminated from the light source 3 is reflected by the floor surface at a point 1 (hereinafter referred to as "reflection point") on its way to the illumination sensor 108, a line m parallel to the vertical direction passes the point 1, a line h and the floor surface intersect at a point n, a line i and a line j intersect at a point o, the line i and the floor surface intersect at a point p, and the line h and the line j intersect at a point q.

Also, in FIG. 7, $H_3$ is length of a line segment an, that is, distance between the light source 3 and the floor surface, $H_4$ is length of a line segment bo, that is, distance between the illumination sensor 108 and the floor surface, $H_5$ is length of a line segment aq, that is, distance between the light source 3 and projection surface 2 in the vertical direction, $D_3$ is length of a line segment ln, that is, distance between the light source 3 and the reflection point 1 in the horizontal direction, $D_4$ is length of a line segment lp, that is, distance between the illumination sensor 108 and the reflection point 1 in the horizontal direction, $D_5$ is length of a line segment eo, that is, distance between the illumination sensor 108 and the projection surface 2 in the horizontal direction, and the line i and the line segment b1 intersect at an acute angle γ. It should be noted that the line segment b1 and the line m as well as the line segment a1 and the line m intersect at the acute angle γ since incident angle and reflection angle of light are same.

As described above, it is necessary to consider reflection ratio in calculating illumination at the point b of the illumination sensor 108 since light from the light source 3 illuminates on the illumination sensor 108 after it is reflected by the floor surface in case of being ceiling-mounted. Estimating the environment illumination from the measured illumination by considering the reflection ratio as described above even in case of being ceiling-mounted is one of main points in this embodiment.

First, the reflection ratio will be described below. The reflection ratio is ratio between illumination of the incident light and illumination of the reflected light. That is, the reflection ratio corresponds to the optical reflection characteristic in this embodiment. As shown in FIG. 7, assuming illumination of the incident light at the point 1 as $L_{in}$ and illumination of the reflected light as $L_{ref}$, the reflection ratio δ can be obtained from following equation. It should be noted that how to determine the reflection ratio will be described later:

[Equation 9]

$$\delta = \frac{L_{ref}}{L_{in}} \quad (9)$$

As described above, in case of applying the point method described above in the positional relationship shown in FIG. 7 by using the reflection ratio obtained by the Equation 9, illumination $L_b$ of the illumination sensor 108 at the point b can be calculated by following Equation 10. It should be noted, since source of light that illuminates on the illumination sensor 108 can be regarded as light from the light source 3 reflected at the point 1 (reflected light), the reflected light at the point 1 can be regarded as the light source from a viewpoint of the illumination sensor 108. Therefore, if the reflected light at the point 1 is regarded as the light source as described above, illumination $L_b$ of the illumination sensor 108 at the point b can be obtained from following equation:

[Equation 10]

$$L_b = \frac{\delta \times L_{in}}{(H_4^2 + D_4^2)} \times \cos\gamma \, [lx] \tag{10}$$

Subsequently, as is the case with FIG. 5, in case of assuming the illumination obtained by the Equation 10 as illumination that the illumination sensor 108 actually measures (measured illumination) $L_{sur}$, following equation holds since $L_{sur}$ equals $L_b$:

[Equation 11]

$$\text{Measured illumination} \quad L_{sur} = \frac{\delta \times L_{in}}{(H_4^2 + D_4^2)} \times \cos\gamma \, [lx] \tag{11}$$

Similarly, illumination at the point e, that is, the environment illumination $L_e$, can be obtained by following equation:

[Equation 12]

$$\text{Environment illumination} \quad L_e = \frac{L}{H_5^2 + (D_3 + D_4 + D_5)^2} \times \cos\beta \, [lx] \tag{12}$$

Also, since illumination at the point 1, that is, illumination of the incident light is not illumination in the vertical direction but illumination in direction along which the light source 3 illuminates toward the point 1 (the normal direction), $L_{in}$ can be obtained by following equation just like as the Equation 1 described above:

[Equation 13]

$$\text{Illumination of the incident light} \quad L_{in} = \frac{L}{(H_3^2 + D_3^2)} \, [lx] \tag{13}$$

Here, by substitute the Equation 13 above for the Equation 11, the measured illumination $L_{sur}$ can be obtained by using the illumination of the light source 3 as following equation:

[Equation 14]

$$L_{sur} = \frac{\delta \times L}{(H_3^2 + D_3^2) \times (H_4^2 + D_4^2)} \times \cos\gamma \, [lx] \tag{14}$$

Consequently, by transforming the Equation 14 above, the illumination of the light source 3 L can be derived from following equation:

[Equation 15]

$$L = \frac{L_{sur}}{\delta} \times (H_3^2 + D_3^2) \times (H_4^2 + D_4^2) \times \frac{1}{\cos\gamma} \times [lx] \tag{15}$$

By substituting the Equation 15 for the Equation 12, the environment illumination $L_e$ can be derived from following equation:

[Equation 16]

$$L_e = \frac{L_{sur}}{\delta} \times \frac{(H_3^2 + D_3^2) \times (H_4^2 + D_4^2)}{H_5^2 + (D_3 + D_4 + D_5)^2} \times \frac{\cos\beta}{\cos\gamma} \, [lx] \tag{16}$$

Therefore, the environment illumination $L_e$ can be estimated by substituting concrete values for $L_{sur}$, $\delta$, $H_3$, $H_4$, $H_5$, $D_3$, $D_4$, $D_5$, $\beta$, and $\gamma$ in the Equation 16 above. However, a user needs to measure those values except $L_{sur}$ and $\delta$ in the use environment actually, and it is very difficult to measure them.

To cope with the issue, the Equation 16 above can be approximated to following equation by regarding terms following $$\frac{L_{sur}}{\delta}$$

as "1" in the Equation 16. Consequently, the environment illumination $L_e$ can be obtained without measuring values to substitute for the variables actually in this embodiment. Since the reflection ratio of the floor surface is considered in the following Equation 17, the environment illumination $L_e$ that corresponds to the actual environment can be estimated:

[Equation 17]

$$L_e = \frac{L_{sur}}{\delta} \, [lx] \tag{17}$$

As described above, the environment illumination $L_e$ can be either derived from the Equation 8 or approximated as the measured illumination $L_{sur}$ in the case of floor-mounted, and can be derived from the Equation 17 above in case of ceiling-mounted. Consequently, it is possible to control the amount of the light projected from the image projecting apparatus 1 and improve visibility for users by converting brightness and intensity of the input video signal based on the derived environment illumination.

Also, the image projecting apparatus 1 in this embodiment can determine electric power value for light amount in projecting light by referring to electric power determining table based on the derived environment illumination $L_e$. The electric power determining table includes the environment illuminations that correspond to output electric power for each output level, and output electric power for light amount in projecting light can be determined from the derived environment illumination. FIG. 8 is a diagram illustrating an electric power determining table. As shown in FIG. 8, the image projecting apparatus 1 uses a lamp whose maximum electric power is 260 W to project light, and five output levels from 1 to 5 in correspondence with the environment illumination are set.

As described above, the image projecting apparatus 1 in this embodiment can project light appropriate for brightness in the use environment by referring to the electric power determining table based on the environment illumination $L_e$ derived from the Equation 8 or the Equation 17 described above.

It should be noted, while the output electric power can be determined by the electric power determining table shown in FIG. 8, illumination in the use environment varies constantly, and the environment illumination that the image projecting apparatus 1 determines also varies constantly. Therefore, the output electric power value needs to be varied along with those variations. However, if the determined environment illumination varies around a threshold for the output level at intervals of several milliseconds or several seconds, brightness of the projected video varies constantly (hereinafter referred to as "flicker"), thereby making users discomfort and reduced visibility.

To cope with this issue, flickers can be prevented by setting bright thresholds and dark thresholds near thresholds of the environment illumination around boundaries of the output level. Consequently, the output level does not vary unless the environment illumination exceeds the bright threshold or falls below the dark threshold. That is, the output level does not vary unless the environment illumination varies at a certain amount, so flickers can be prevented. FIG. 9 is a diagram illustrating the electric power determining table that includes the bright thresholds and the dark thresholds. In FIG. 9, for each threshold of the environment illumination for the output level, the bright threshold is derived by adding 10% to the upper limit for the threshold, and the dark threshold is derived by subtracting 10% from the lower limit for the threshold. That is, tables shown in FIG. 8 and FIG. 9 associating with the luminous intensity of the projection light are used.

Figure 10:
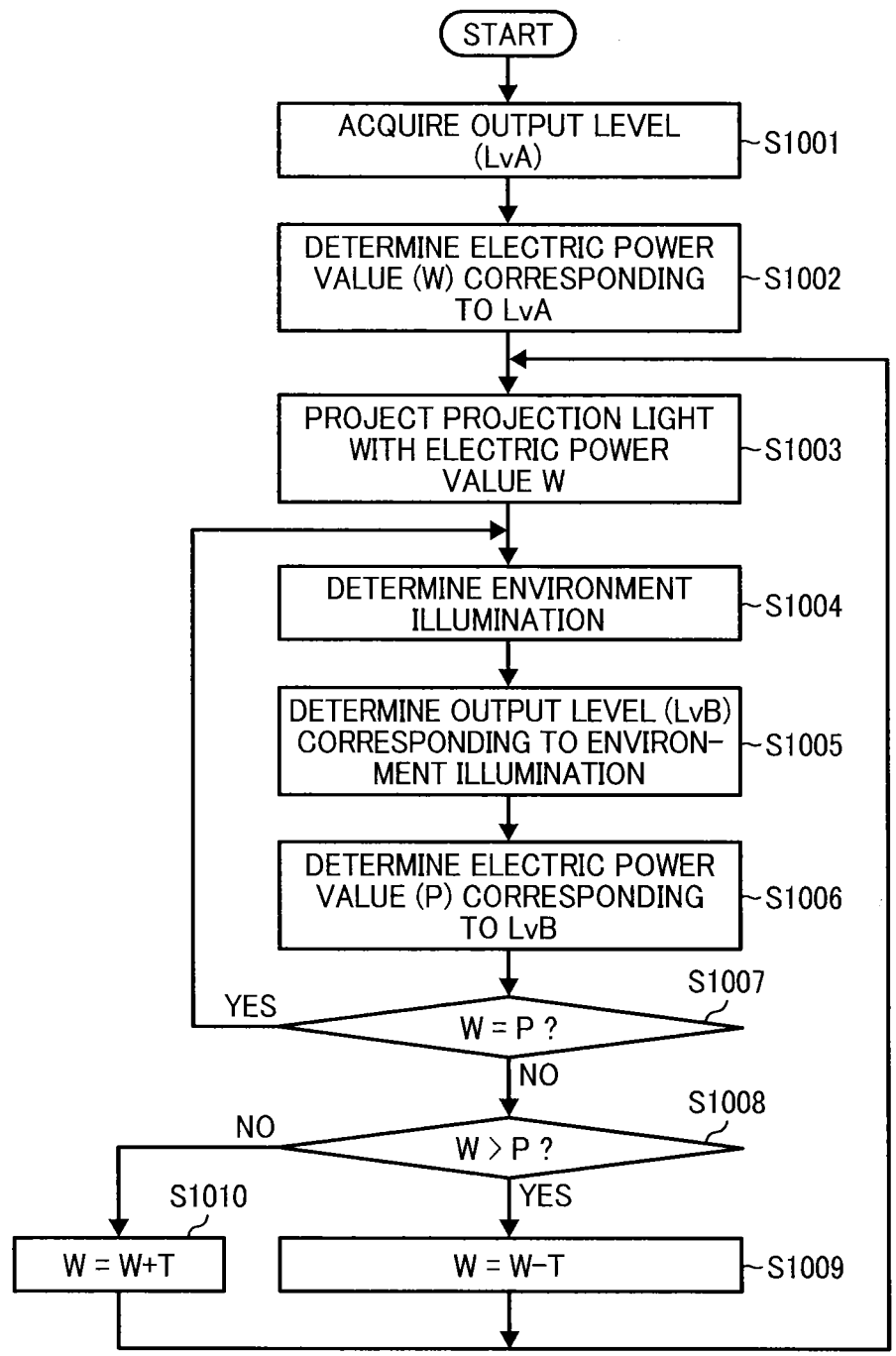
FIG. 10 is a flowchart illustrating a process of controlling amount of projection light automatically as an embodiment of the present invention.

Next, process in which the image projecting apparatus 1 in this embodiment controls the amount of the projection light automatically will be described below with reference to FIG. 10. FIG. 10 is a flowchart illustrating a process of controlling the amount of the projection light automatically in the image projecting apparatus 1 in this embodiment. It should be noted that the case for preventing the flicker described above will be described below with reference to FIG. 10. Also, the image projecting apparatus 1 in this embodiment includes a mode in which the amount of the projection light is controlled automatically (hereinafter referred to as "automatic light amount control mode") and a mode in which the amount of the projection light is controlled manually (hereinafter referred to as "manual light amount control mode") and is configured to select either mode at user's choice. It should be noted that the automatic light amount control mode is selected by user operation on the image projecting apparatus 1 in following description.

As shown in FIG. 10, after turning on the automatic light amount control mode of the image projecting apparatus 1 in this embodiment, the video signal processor 130 acquires the output level LvA when the automatic light amount control mode is used last time or predefined by default (S1001). The video signal processor 130 determines the electric power value W that corresponds to the acquired output level LvA with reference to the electric power determining table shown in FIG. 9 (S1002). The image projecting apparatus 1 projects light with light amount at the electric power value W determined in S1002 (S1003).

Subsequently, the video signal processor 130 determines the environment illumination in accordance with the installation condition in the way described above (S1004). That is, the video signal processor 130 functions as an illumination calculating unit in S1004. The video signal processor 130 determines the output level LvB based on relationship between the determined environment illumination and the bright/dark threshold with reference to the electric power determining table shown in FIG. 9 (S1005). That is, the video signal processor 130 functions as a projection light intensity determining unit in S1005.

In S1005, the video signal processor 130 determines LvA as LvB if the determined environment illumination is within the bright threshold and the dark threshold, LvA−1 as LvB if the determined environment illumination is larger than the bright threshold, and LvA+1 as LvB if the determined environment illumination is smaller than the dark threshold.

Next, the video signal processor 130 determines the electric power value P that corresponds to the output level LvB determined in S1005 with reference to the electric power determining table shown in FIG. 9 (S1006). Subsequently, the video signal processor 130 compares the electric power value W with the electric power value P (S1007). If the video signal processor 130 determines that W equals P (YES in S1007), the same process from S1004 is executed.

On the other hand, if the video signal processor 130 determines that W does not equal P (NO in S1007), it compares W with P (S1008). If the video signal processor 130 determines that W is larger than P (YES in S1008), it subtracts predefined value T from the electric power value W since the projection light is brighter compared to the determined environment illumination and determines W−T as the new electric power value W (S1009).

Contrarily, if the video signal processor 130 determines that W is smaller than P (NO in S1008), it adds T to W since the projection light is darker compared to the determined environment illumination and determines W+T as the new electric power value W (S1010). Subsequently, after executing process in S1009 and S1010, the same process from S1003 is executed. Lastly, the image projecting apparatus 1 finishes the process that the amount of projection light is controlled automatically if it finishes projecting light or turns off the automatic light amount control mode.

It should be noted that the predefined value T is up-and-down range of the output electric power value for the process in S1009 and S1010. If larger value is set for T, the output electric power value and brightness of the projection light changes rapidly. If smaller value is set for T, the output electric power value and brightness of the projection light changes little by little. Therefore, it is necessary to set the predefined value T so that brightness of the projection light changes in the way to reflect the environment illumination appropriately and not to make users discomfort.

As described above, the image projecting apparatus 1 in this embodiment estimates the environment illumination $L_e$ by using the Equation 8 and the measured illumination in case of being floor-mounted and by using the Equation 17 in case of being ceiling-mounted and adjusts the amount of projection light based on the estimated environment illumination $L_e$. Therefore, it is possible to acquire precise information on optical environment at the projection surface and to project light at amount of light appropriate for the optical environment.

Next, how to determine the reflection ratio S will be described below. The reflection ratio δ can be derived from following equation with standard illumination $L_{sta}$ and the measured illumination $L_{sur}$ measured by the illumination sensor 108 at the point b shown in FIG. 7:

[Equation 18]

$$\delta = \frac{L_{sur}}{L_{sta}} [lx] \tag{18}$$

Here, the standard illumination is defined in Japanese Industrial Standards (JIS) or determined experimentally, and it is registered in the image projecting apparatus 1 preliminarily. It should be noted, as shown in FIG. 11, since the standard illumination is determined for each environment, the reflection ratio δ can be derived from the Equation 18 automatically just by setting environment name on the image projecting apparatus 1 by a user.

Also, since the reflection ratio δ is predefined for each color and material of the floor surface as shown in FIG. 12 and FIG. 13, the reflection ratio δ can be determined by setting the color or the material of the floor surface by a user. For example, if a user sets white for the floor color from a table shown in FIG. 12 and flooring for the floor material from a table shown in FIG. 13, the reflection ratio of the white flooring can be calculated as 80%×85%=68% since the reflection ratio of white is 80% and the reflection ratio of flooring is 85%.

It should be noted, while the case of controlling the amount of the projection light projected by the image projecting apparatus 1 is described in this embodiment, it is possible to convert the brightness and the intensity of the video signal input from the external device such as the PC based on the determined environment illumination, or the process to control the amount of the projection light and the process to convert the brightness and the intensity of the video signal can be combined.

As described above, since the image projecting apparatus 1 in this embodiment can measure the illumination considering the optical reflecting characteristic of the floor surface in case of being ceiling-mounted, it is possible to acquire precise information on the use environment as in case of being floor-mounted even in case of being ceiling-mounted.

Also, the image projecting apparatus 1 in this embodiment can estimate the illumination at the projection surface based on the measured illumination, adjust the amount of projection light based on the estimated illumination, and convert the brightness and the intensity of the input video signal. Therefore, since the image projecting apparatus 1 can acquire precise information on the optical environment at the projection surface, it is possible to project light appropriate for the brightness and the intensity of the projection surface, thereby improving user visibility for the projected video.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An image projecting apparatus that projects an image on a projection surface, comprising:
    an illumination measuring unit to measure illumination of light illuminated on a side of the image projecting apparatus opposite a supported surface of the image projecting apparatus;
    an illumination calculator to calculate an illumination at the projection surface based on the measured illumination measured by the illumination measuring unit;
    an image projecting unit that projects the image on the projection surface; and
    a projection light intensity determining unit to determine a luminous intensity of projection light from the image projecting unit,
    wherein the illumination calculator calculates an illumination at the projection surface based on optical reflecting characteristics of the installation environment of the image projecting apparatus,
    wherein the optical reflecting characteristics represent a ratio between illumination of incident light and illumination of reflected light at the side of the image projecting apparatus opposite the supported surface of the image projecting apparatus, represent a ratio between standard illumination predefined in accordance with installation environment and the illumination measured by the illumination measuring unit, or are determined based on at least one of material and color of a side of the image projecting apparatus opposite the supported surface of the image projecting apparatus, and
    wherein the illumination calculator sets the illumination measured by the illumination measuring unit divided by the optical reflecting characteristics as the illumination at the projection surface.

2. The image projecting apparatus according to claim 1, wherein the illumination calculator calculates the illumination at the projection surface based on distance to the projection surface.

3. The image projecting apparatus according to claim 1, wherein the illumination calculator calculates the illumination at the projection surface based on optical reflecting characteristics of a side of the image projecting apparatus opposite the supported surface of the image projecting apparatus.

4. The image projecting apparatus according to claim 1, wherein the image projecting unit is configured to:
    convert at least one of brightness and intensity of image information input from an external device to display the image on the projection surface based on the illumination calculated by the illumination calculator; and
    project the image on the projection surface based on the converted image information.

5. The image projecting apparatus according to claim 1, wherein the projection light intensity determining unit sets intensity of projection light corresponding to a range that includes the illumination calculated by the illumination calculator as the intensity of the projection light from the image projecting unit with reference to a table that associates predefined ranges of illumination with the intensity of the projection light from the image projecting unit.

6. A method of controlling an image projecting apparatus that projects an image on a projection surface, comprising the steps of:

measuring an illumination of light illuminated on the opposite side of supported surface of the image projecting apparatus;

calculating an illumination at the projection surface based on the measured illumination measured by the illumination measuring unit;

projecting the image on the projection surface;

determining a luminous intensity of projection light in the projecting step; and calculating an illumination at the projection surface based on optical reflecting characteristics of the installation environment of the image projecting apparatus, wherein the optical reflecting characteristics represent a ratio between illumination of incident light and illumination of reflected light at the opposite surface of a ceiling, represent a ratio between standard illumination predefined in accordance with its installation environment and the illumination measured in the illumination measuring step, or are determined based on at least one of material and color of a side of the image projecting apparatus opposite the supported surface of the image projecting apparatus, and the method further comprising the step of setting the illumination measured in the illumination measuring step divided by the optical reflecting characteristics as the illumination at the projection surface.

7. The method of controlling the image projecting apparatus according to claim 6, further comprising the step of calculating the illumination at the projection surface based on distance to the projection surface.

8. The method of controlling the image projecting apparatus according to claim 6, further comprising the steps of:

converting at least one of brightness and intensity of image information input from an external device to display the image on the projection surface based on the illumination calculated by the illumination calculator; and projecting the image on the projection surface based on the converted image information.

9. The method of controlling the image projecting apparatus according to claim 6, further comprising the step of setting intensity of projection light corresponding to range that includes the illumination calculated in the illumination calculating step for the intensity of the projection light in the image projecting step with reference to a table that associates predefined ranges of illumination with the intensity of the projection light in the image projecting step.

10. A non-transitory recording medium storing a program that, when executed by a computer, causes the computer to implement a method of controlling an image projecting apparatus that projects an image on a projection surface, the method comprising the steps of:

measuring an illumination of light illuminated on a side of the image projecting apparatus opposite a supported surface of the image projecting apparatus;

calculating illumination at the projection surface based on the measured illumination;

projecting the image on the projection surface;

determining luminous intensity of projection light in the projecting step; and calculating illumination at the projection surface based on optical reflecting characteristics of the installation environment of the image projecting apparatus, wherein the optical reflecting characteristics represent a ratio between illumination of incident light and illumination of reflected light at the opposite surface of a ceiling, represent a ratio between standard illumination predefined in accordance with its installation environment and the illumination measured in the illumination measuring step, or are determined based on at least one of material and color of a side of the image projecting apparatus opposite the supported surface of the image projecting apparatus, and the method further comprising the step of setting the illumination measured in the illumination measuring step divided by the optical reflecting characteristics as the illumination at the projection surface.

\* \* \* \* \*